(12) United States Patent
Wang (10) Patent No.: US 10,290,906 B2
(45) Date of Patent: May 14, 2019

(54) FLEXIBLE SOLID-STATE MULTIPLE-STACKED PLANAR LITHIUM-ION BATTERY MODULE

(71) Applicant: Jiaxiong Wang, Danville, CA (US)

(72) Inventor: Jiaxiong Wang, Danville, CA (US)

(*) Notice: Subject to any disclaimer, the term of this patent is extended or adjusted under 35 U.S.C. 154(b) by 211 days.

(21) Appl. No.: 15/340,995

(22) Filed: Nov. 2, 2016

(65) Prior Publication Data

US 2018/0123177 A1   May 3, 2018

(51) Int. Cl.
| | |
|---|---|
| *H01M 10/42* | (2006.01) |
| *H01M 2/30* | (2006.01) |
| *H01M 4/04* | (2006.01) |
| *H01M 2/20* | (2006.01) |
| *H01M 10/0525* | (2010.01) |
| *H01M 10/0565* | (2010.01) |
| *H01M 10/0585* | (2010.01) |
| *H01M 10/04* | (2006.01) |
| *H01M 10/44* | (2006.01) |

(52) U.S. Cl.
CPC ......... *H01M 10/425* (2013.01); *H01M 2/204* (2013.01); *H01M 2/30* (2013.01); *H01M 4/0404* (2013.01); *H01M 10/0436* (2013.01); *H01M 10/0525* (2013.01); *H01M 10/0565* (2013.01); *H01M 10/0585* (2013.01); *H01M 10/441* (2013.01); *H01M 2010/4271* (2013.01)

(58) Field of Classification Search
None
See application file for complete search history.

(56) References Cited

U.S. PATENT DOCUMENTS

2016/0149177 A1* 5/2016 Sugeno ................ H01G 11/10
307/9.1

* cited by examiner

*Primary Examiner* — Scott J. Chmielecki (57) ABSTRACT

A flexible solid-state multiple-stacked planar lithium-ion battery module is provided. It comprises a number of lithium-ion battery groups that consist of back-to-back multiple-stacked electrochemical cells interconnected in parallel. Solid electrolytes are used in all of electrochemical cells. The battery groups are packed and sealed with flexible polymeric materials. The battery groups are combined into some battery sections. The positive and negative terminals of every battery group are connected to corresponding side terminals which are controlled with side switches. The positive terminals of the first battery groups in every battery section and the negative terminals of the last battery groups in every battery section are further connected to a positive rotary switch and a negative rotary switch, respectively. With these different switches and circuit control boxes, input and output voltages and currents of the battery module can be freely adjusted and controlled.

7 Claims, 3 Drawing Sheets

FLEXIBLE SOLID-STATE MULTIPLE-STACKED PLANAR LITHIUM-ION BATTERY MODULE

FIELD OF THE INVENTION

The present invention relates to a flexible solid-state multiple-stacked planar lithium-ion battery module which comprises a number of lithium-ion battery groups that consist of some solid-state electrochemical cells. The invention also relates to designs of changeable electronic interconnections among different battery groups to control input/output currents and voltages of the battery module. The lithium-ion battery module related to the present invention possesses features of flexibility, safety, light weight, fast charging characteristics, adjustable output powers, and adaptation to solar modules.

BACKGROUND OF THE RELATED ART

Lithium-ion batteries have been developed for several decades. Different from traditional lead acidic or zinc manganese batteries, the lithium-ion batteries are using non-aqueous electrolyte solutions. With the development of lithium-ion batteries, various materials have been used as electrodes and electrolytes. For example, the materials of positive electrodes involve different transition metallic oxides, such as $LiCoO_2$, $LiNiO_2$, $LiMn_2O_4$, $LiFePO_4$, $LiV_2O_5$ and their combinations. The main materials of negative electrodes are still carbon family, including mesophase carbon micro beads (MCMB), artificial graphite, carbon coated natural graphite, graphene, silicon, and metallic alloys. Although lots of electrolytes are currently developed to the lithium-ion batteries, the most popular electrolytes are still $LiPF_6$, $LiClO_4$, $LiBF_4$, etc., combined with some carbonate solvents such as propylene carbonate (PC) and ethylene carbonate (EC). In addition, other materials, such as separates, additives, and flame retardants, have been used to enhance properties and safety of the lithium-ion batteries.

Owing to their high energy density and environmental friendship, the lithium-ion batteries (LiBs) have replaced nickel-metalhydride (Ni-MH) and nickel-cadmium (Ni—Cd) secondary batteries to be applied in different areas, from cell phones, laptop computers to electric vehicles. In contrast to their extensive investigations and applications, the lithium-ion batteries show much less selections in their shapes and structures. Fundamentally, there are button styles, planar, cylindrical and cuboids shapes. With the development of thin film coating technologies and applications of solid electrolytes, thin film and flexible lithium-ion batteries have attracted more and more attentions. In particular, some flexible electronics such as flexible flat panel displays may require flexible lithium-ion batteries. Therefore, the flexible lithium-ion batteries have attracted significant attention in recent years. For example, U.S. Pat. Nos. 5,552,239 and 5,478,668 described large capacity rechargeable lithium-ion batteries with folded or rolled structure to obtain rectangular or cylindrical shapes. U.S. Pat. No. 5,498,489 also disclosed a lithium-ion battery constructed of lithium-ion containing folded and stacked electrochemical cells which have a folded continuous, flexible lithium-ion containing polymer laminate electrolyte sandwiched between first and second polarity lithium containing discrete electrode plates.

A flexible thin planar lithium-ion battery may be laminated with different materials. As described in U.S. Pat. No. 5,478,668, it comprised an electrically conductive collector foil or grid, such as copper, nickel, nickel plated metal, or high-nickel stainless steel, upon which is laid a negative electrode membrane comprising an intercalatable material, such as carbon or graphite, or a low voltage lithium insertion compound, such as $WO_2$, $MoO_2$, or Al, dispersed in a plasticized polymeric binder matrix. An electrolyte/separator film of plasticized VdF:HFP copolymer was positioned upon electrode element and covered with a positive electrode membrane comprising a composition of a finely divided lithium intercalation compound, such as $LiMn_2O_4$, $LiCoO_2$, or $LiNiO_2$, in a plasticized polymeric binder matrix. An aluminum collector foil or grid completed the assembly which was then pressed between plates under heat and pressure to soften and bond the polymeric compounds and laminate the membrane and collector layers. It may require some special laminating materials to avoid moisture or $O_2$ invasion, as disclosed in U.S. Pat. No. 5,445,856. The prior art of U.S. Pat. No. 6,828,065 disclosed that the carbon anode was laminated or coated in a very thin film on both sides of copper metalized polymer (e.g., PET) material. The similar structure was applied to the cathode that might be coated onto an aluminum current collector. An insulator sheet and a metalized PET current collector complete the assembly to laminate the lithium-ion battery.

A desirable rechargeable lithium-ion battery is expected to have high energy density, fast charging capability, and long lifetime. The batteries disclosed in U.S. Pat. Nos. 5,498,489, 5,478,668 and 6,828,065 were laminated and packed with folded or rolled shapes to increase the capacity of the batteries in limited sizes. However, it may lose the flexibility of the batteries. In some other embodiments of the previous inventions, as described in U.S. Pat. No. 8,475,954, flexible, multi-voltage battery modules had multiple cells that were nested together to enhance the energy density. In these embodiments, cylindrical lithium-ion cells were placed in a housing or case with interlocking tabs that allowed multiple modules to be connected together. Within a module, the cells could be connected in different configurations by buss bars at the top and the bottom of the battery cells.

The present invention provides a flexible solid-state multiple-stacked planar rechargeable lithium-ion battery module. It is thin and flat to be hanged in the wall and carried outdoor in a roll. Multiple-stacked planar lithium-ion battery cells are coated layers by layers and laminated within moisture and $O_2$ resistant plasticized polymers. The multiple-stacked battery cell planes are combined into many battery sections of multiple-stacked electrochemical cell groups which are interconnected in series or in parallel according to requirement of the output voltages and powers. These multiple-stacked lithium-ion battery groups can be freely combined and controlled with switches and programmable logic circuit (PLC) to adjust the input/output voltages and currents. This rechargeable planar lithium-ion battery module can be quickly charged because every group of the multiple-stacked electrochemical cells possesses limited electroactive materials and internal resistances. Furthermore, the presently invented lithium-ion battery module can be remotely controlled.

SUMMARY OF THE INVENTION

The present invention provides a flexible solid-state planar rechargeable lithium-ion battery module that comprises a plurality of interconnected electrochemical cell groups, each of which is of a unitary planar laminated structure comprising several electrochemical cells connected one another in parallel. Every single electrochemical cell comprises an anode, a cathode, and a piece of solid polymer electrolyte, gel polymer electrolyte or polyelectrolyte film/separator sandwiched between electrically conductive anode and cathode collector foils or grids. Upon the anode foil or grid, such as copper, nickel, nickel plated metal, or high-nickel stainless steel, is laid an anode membrane comprising an intercalatable material, such as carbon or graphite, silicon modified graphite, or a low voltage lithium insertion compound, such as $WO_2$, $MoO_2$, or Al, dispersed in a plasticized polymeric binder matrix. A thin film of solid-state electrolyte is positioned upon this anode membrane and covered with a cathode membrane comprising a composition of a finely divided lithium intercalation compound, such as $LiMn_2O_4$, $LiCoO_2$, $LiFePO_4$, $LiV_2O_5$, or $LiNiO_2$, in a plasticized polymeric binder matrix. An aluminum cathode current collector foil or grid is laid on the cathode membrane to complete the assembly of a single electrochemical cell. On the other side of this aluminum collector foil or grid, another layer of cathode material is deposited, followed with an electrolyte/separator film, an anode membrane, and an anode collector foil or grid, respectively. In this way, several electrochemical cells can be deposited back to back with current collector foils or grids are shared by two cells except for the bottom collector and the top collector. Different lithium-ion battery groups that comprise multiple-stacked electrochemical cells interconnected in parallel are then interconnected with metal strips or wires to assemble into a flexible planar lithium-ion battery module. Finally, all of interconnected lithium-ion battery groups are pressed between ethylene vinyl acetate (EVA) films and a top and a bottom laminate films such as polyimide (PI) under heat and pressure to soften and bond the polymeric compounds and laminate the membrane and collector layers.

Different layers for the present invention can be coated through roll-to-roll vacuum or non-vacuum deposition methods, followed by mechanical or laser scribing to isolate various lithium-ion battery groups. They can also be fabricated through traditional manufacture processes to coat and add different materials layer by layer and cut into different lithium-ion battery groups. Then these lithium-ion battery groups can be interconnected via metal strips or wires according to a predesigned circuit. These lithium-ion battery groups can be further combined into different battery sections that can be connected to some switches for on/off operations on the sides. A roll-to-roll coated multiple-stacked flexible lithium-ion battery substrate can also be cut into some small lithium-ion battery groups, then interconnected with some conductive metal strips, laminated with EVA films and moisture and oxygen resistant copolymers, and finally attached electronically controlling devices and other accessories to complete fabrication of a battery module.

Solid electrolytes used in the present invention may be solid polymer electrolytes, such as poly(ethylene oxide) (PEO) and poly(propylene oxide) (PPO), gel polymer electrolytes, such as polyacrylonitrile (PAN), poly(vinylidene fluoride) (PVDF) and poly(methyl methacrylate) (PMMA), and polyelectrolytes. These solid electrolytes give great contributions to the present invention.

DETAILED DESCRIPTION OF THE INVENTION

The present invention provides a kind of flexible solid-state multiple-stacked planar secondary lithium-ion battery module which comprises a number of interconnected multiple-stacked lithium-ion battery groups. Every battery group comprises several stacked solid-state lithium-ion electrochemical cells which are interconnected in parallel to provide larger currents. Different battery groups in the module can be interconnected in series to increase output voltages or in parallel to increase output currents. With this kind of design, a single module can provide significant output power that can be determined by a user. Because it is softly packed with planar layers, the battery module is flexible and light. Therefore, it is convenient to be carried and suitable to be incorporated into wearable equipment. The presently invented battery module is of solid-state and all of the electrochemical cells are isolated from oxygen. It is much safer than a cylindrical or a square battery because heat shall not accumulated in said planar battery module. The use of solid-state electrolytes significantly increases safety of a lithium-ion battery. Although a multiple-stacked package increases the thickness of said battery module, the device presently provided is still much thinner and lighter than a rolled cylindrical or a square battery.

Besides what is described above, the present module possesses many more unique advantages. For example, all of the single electrochemical cells can be charged simultaneously, which achieves quickly charging lithium-ion batteries. To the same amount of active materials loaded in a lithium-ion battery, a structure with multiple-stacks should benefit fast-charging and high-current discharging due to lower internal resistance arisen from short immigration distances of lithium ions between the anode and the cathode in comparison with a single stacked battery. The interconnected battery groups can be combined into several battery sections. One can select different output powers to use one or more battery sections, which can increase the discharge time of the present device. Multiple lithium-ion battery modules can be simply interconnected in series or in parallel to form an array according to required output voltages or currents. Said lithium-ion battery module includes one or more input/output interfaces to connected with solar modules or other external energy sources.

Figure 1:
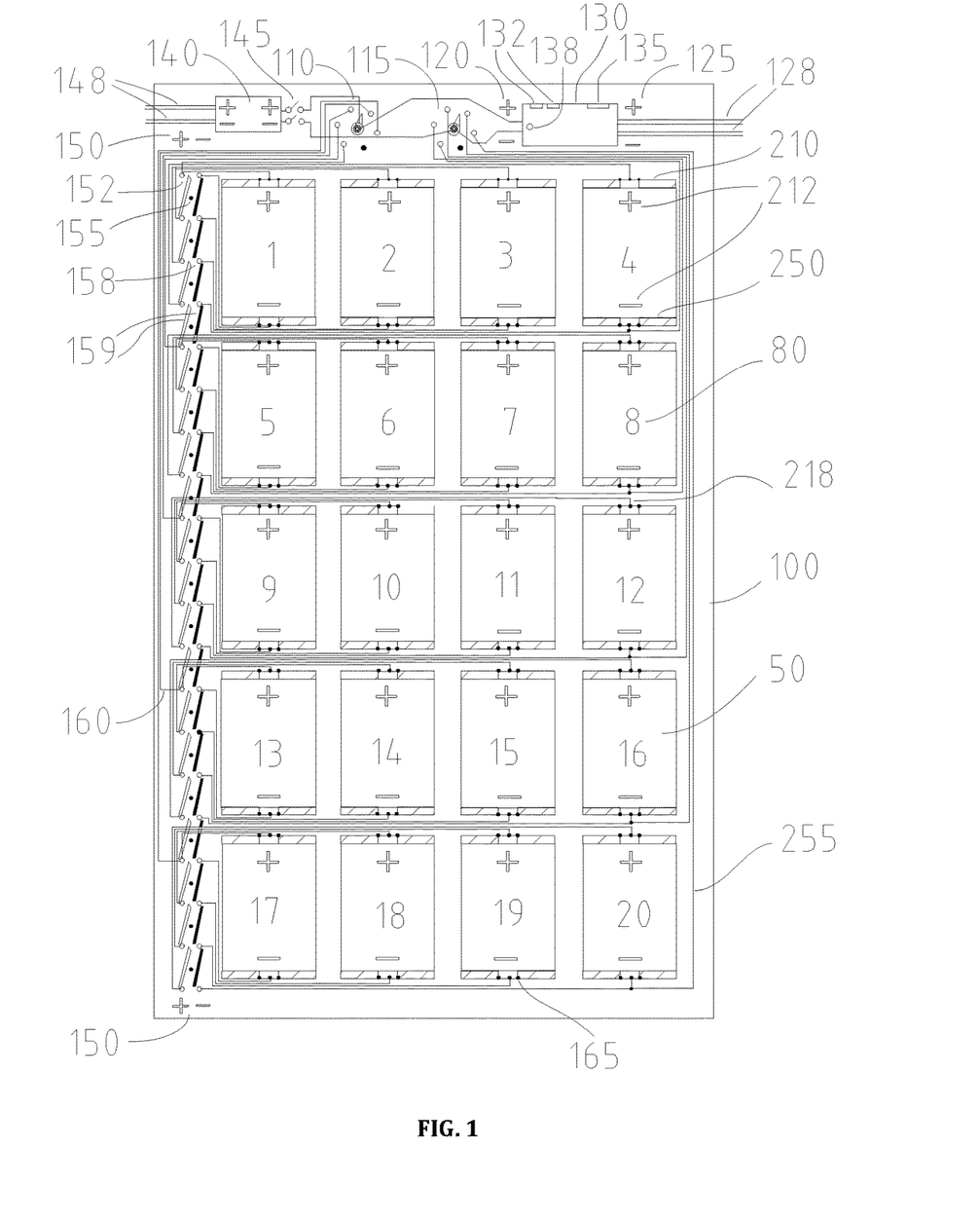
FIG. 1 shows a flexible solid-state planar rechargeable lithium-ion battery module with interconnected multiple-stacked lithium-ion battery groups and related electronic devices.

As one embodiment, the present invention is demonstrated in FIG. 1. This lithium-ion battery module 100 comprises twenty of isolated flexible solid-state planar lithium-ion battery groups 50 marked with numbers of 1 to 20. Every lithium-ion battery group 50 consists of three parallel connected solid-state electrochemical cells with two positive terminals (cathodes) 210 and two negative terminals (anodes) 250. Number 212 indicates pole signs of the battery groups. All of the positive and negative terminals of said lithium-ion battery groups 50 are introduced to the other corresponding side terminals 152 and 158 on the left side of said battery module. There are twenty pairs of side terminals signs of which are indicated with a FIG. 150. These twenty pairs of positive (152) and negative (158) side terminals are arranged from top to bottom and are associated to said battery groups numbered from 1 to 20. Between the positive and the negative side terminals, are there some neutral terminals 155 that are independent conductors without connecting to any part of circuits or devices. Side switches 159 control energy output and input of said battery module. They can be toggle switches with a single-pole and double-throw (SPDT), push-button switches or electrically controlled relays. The double-throw for these switches is said neutral terminals and signed (positive or negative) terminals. In addition, these twenty of said battery groups 50 are combined into five battery sections in this embodiment. The first positive side terminals of these five battery sections are introduced through five metal strips or wires 160 to a rotary switch 110 where five poles (open circles) from left bottom clockwise to right bottom are associated to the positive side terminals numbered with 1, 5, 9, 13, and 17. Due to limited space, these numbers are not marked to the poles in FIG. 1. Similarly, the last negative side terminals of these five battery sections are introduced through five metal strips or wires 225 to another rotary switch 115 where five poles (open circles) from left bottom clockwise to right bottom are associated to the negative side terminals numbered with 4, 8, 12, 16 and 20.

With the designs mentioned above, one can freely control how to use this battery module. If all of the positive and the negative side switches 159 are switched to the terminals with the same signs, for example, all of the twenty said battery groups have been connected in parallel if the positive rotary switch 110 is dialed to Pole 1 and the negative rotary switch 115 is dialed to Pole 20. Because three electrochemical cells in any single battery group 50 are connected in parallel, all of 60 electrochemical cells in said lithium-ion battery module 100 are interconnected in parallel according to the connection mentioned above. If said battery module is charged with a constant voltage, the required time is the same as a single electrochemical cell. As a result, the time necessary to charge the entire module should be short because there is limited amount of active materials in every single electrochemical cell. These limited amount of active materials associated with solid-state electrolyte films in every single electrochemical cell construct the solid-state planar cell structure.

If all of said side switches 159 are switched to the neutral poles 155, by contrast, all of the battery groups will be connected in series if the positive rotary switch 110 is dialed to Pole 1 and the negative rotary switch 115 is dialed to Pole 20. If the voltage of every battery group is 3.9 volt, for instance, the output voltage of the entire module may be 78 volt. A prior art by Hayashi et. al (J. Power Sources, doi: 10.1016/j.jpowsour, 2007.06.081), for a sputtered $LiCoO_2$ thin film cathode with 6.2 µm thickness, achieved a unit discharging capacity of 250 $\mu A \cdot h \cdot cm^{-2}$. If the effective area of every electrochemical cell is 500 $cm^2$ (20 cm×25 cm) in the present invention, therefore, for a thin film cathode of $LiCoO_2$ with a thickness of 5 micrometer (µm), every battery group may possesses a capacity of 300 mAh for a battery group with three electrochemical cells interconnected in parallel. For the entire module where all of said battery groups are connected in series, the output power may be about 23 Wh with an output voltage about 78 volt. One can also use said side switches 159 to make four said battery groups connected in series in every battery section, but five battery sections connected in parallel to achieve a 1500 mAh discharge capacity and reduce the output voltage of the entire module down to about 15 volts. Numbers of the electrochemical cells in every said battery group may be increase up to 10 to enhance the output current and significantly increase the discharge capacity for each battery group. However, it may significantly increase complexity of manufacturing processes. One may also think increasing thicknesses of positive and negative electrode films, for example, to more than 100 µm, to achieve large discharge capacity of each battery group. In comparison with the battery groups comprising only multiple-stacked thin film electrochemical cells which need very short time for charging, a battery group containing multiple-stacked flexible electrochemical cells with very thick cathode and anode layers requires more time for charging due to larger internal resistances, longer lithium ion migration pathways and more active materials between two electrodes.

In another aspect of this embodiment, all of the battery groups can be connected in series and charged from the input/output terminal 128 (125 represent signs of two lines) or input terminal 148. In this connection, all of the battery groups can be charged simultaneously with a constant current. The constant DC current or voltage can be provided from two circuit control boxes 130 and 140, both of which have circuits inside to provide constant DC current and voltage and protect charge/discharge from overflow. The circuit control box 130 also includes some devices and circuits inside to control and protect the whole module. Two USB sockets 132 and one spare port 135 to connect external device are opened to the circuit control box 130. One or more flash lights 138 are installed in the circuit control box 130 to indicate the working status of said lithium-ion battery module 100. Moreover, said lithium-ion battery module can be remotely controlled and wireless charged through some devices installed inside said circuit control box 130. The output terminal 128 is also used for input. In some cases, the other circuit control box 140 may not be necessary. If one uses only parts of the battery sections for discharge but wants to charge the rest parts, however, the circuit control box 140 shall be useful. Two rotary switches 110 and 115 are connected to the circuit control box 130, and their signs are indicated with FIG. 120. If the circuit control box 140 is installed, a pair of connectors 145 should be installed between the circuit control box 140 and the rotary switches 110 and 115. Under this construction, the rotary switches may be more complicated with connections of both said circuit control box 130 and 140. Some protection circuits may be necessary to be included inside said circuit control boxes to avoid any conflict from the input and the output sources. As a result, one can use a part of said battery module for discharging and the other part of it for charging. In particular, the present lithium-ion battery module can be connected to a solar module for energy storage. Because different sections of the battery groups can be freely combined in series or in parallel with the present lithium-ion battery module, one can use a part of said module according to different output requirements to increase the time of usage. If one uses 1000 mA to discharge for one hour by using only one battery section (containing four battery groups), For instance, the entire battery module can be continuously used for more than five hours without charging. Meanwhile, the battery sections just discharged can be charged simultaneously through a power source, e.g., a solar module, to use it for a period of even longer time.

The present invention provides an idea for using a flexible solid-state planar lithium-ion battery. In an advanced embodiment, the battery module of FIG. 1 can be designed to be automatically controlled. Under this circumstance, a programmable logic controller (PLC) can be incorporated into the circuit control box 130. Those switches or relays, including the rotary switches 110 and 115, the side switches 159, and the other circuit control box 140 as well, are all setup to be automatically controlled with the PLC inside the circuit control box 130. With this advanced but more expensive design, different battery groups can be freely combined with the PLC and even remotely controlled with a computer or a cell phone.

The lithium-ion battery module 100 shown in FIG. 1 can also be cut into different pieces as well in some special applications. For example, flexible solar modules have been commercially manufactured to be incorporated into some wearable equipment. However, their applications are restricted because they may not be exposed to the sun in most time. In order to compensate this insufficiency, one may consider to store the sun energy with a rechargeable battery. However, this rechargeable battery may be heavy, rigid and need to occupy other spaces. By contrast, the presently invented lithium-ion battery module can be separated into different battery sections and packed into the wearable equipment as some pieces of wearable lithium-ion storage devices, among which a circuit control box 130 is incorporated to increase application ranges of some wearable solar modules. With this design, each different battery section shall be independently packed and sealed. The interconnection among different battery sections can be achieved with insulated metal wires. The side terminals, side switches and rotary switches shown in FIG. 1 should have the same functions as a single battery module.

Figure 2:
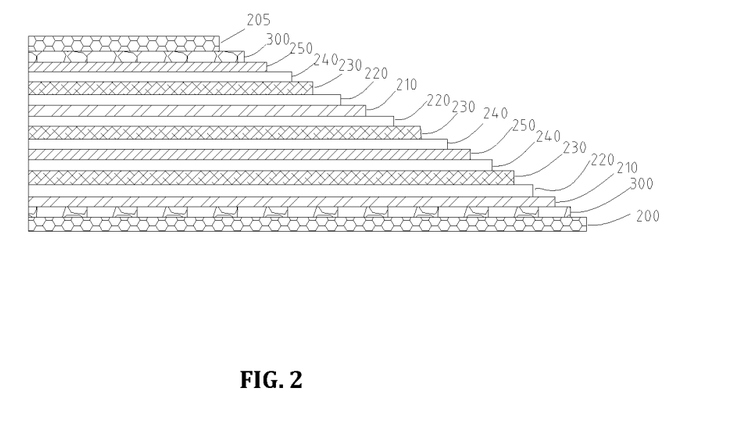
FIG. 2 illustrates a side view of a multiple-stacked lithium-ion battery group with different layers from the bottom to the top.

The layer-by-layer packing structure of the present lithium-ion battery module 100 is illustrated in FIG. 2. A bottom packing film 200 and a top packing film 205 are outmost layers of said battery module. The materials for these two outmost packing layers may be polyimide (PI), polybenzimidazoles (PBIs), polyamideimide (PAI), polyetheretherketone (PEEK), polyethersulfone (PES), and polyamide (PA). These polymer films possess excellent mechanical strength and heat resistance. For example, the PI membrane can be heated over 450° C. without deformation. Attached to interior surfaces of these two polymer films, there are two ethylene vinyl acetate (EVA) films 300. The EVA films have been extensively used as sealing materials in fabrication of solar modules. At a temperature about 120° C., the EVA films are melted and sealed solar cells very well. Therefore, it is used in the present invention as a sealing material to pack said lithium-ion battery groups inside the films. All of these battery groups are firstly electrically isolated one another, and then electrically connected with some metal strips or wires. In a manufacture process, the depositions of active materials for said lithium-ion battery electrochemical cells can be carried out through roll-to-roll processes to fabricate the stacked layers. The product rolls can be cut into various battery groups that are then electrically connected one another according to predesigned battery module areas. These interconnected battery groups are packed inside a laminator with a stacked structure as follows: backplane film/EVA/battery groups/EVA/front plate film. During the lamination process, the EVA films are melted and fix all the stacked layers in certain positions. Finally, one can add the other devices such as circuit control boxes and switches onto the front plate to complete fabrication of a flexible solid-state planar lithium-ion battery module.

FIG. 2 reveals the other layers in said lithium-ion battery module 100. The third layer 210 from the bottom is a metal foil such as aluminum to collect current from the cathode layer 220. Above 220 is a solid electrolyte/separator film 230 that is underneath the anode layer 240. Another metal (such as copper) foil 250 is arranged on 240 to collect current from the anode layer 240. These multiple layers from 210 to 250 construct a completed solid-state lithium-ion electrochemical cell. As shown in FIG. 2, several layers 240, 230, 220, and 210 in a reversed order are applied on the surface of the metal foil 250 to construct another electrochemical cell. Similarly, the third electrochemical cell is added. FIG. 2 demonstrates three solid-state electrochemical cells to generate a battery group. The different electrochemical cells are arranged in a way of "back to back", which makes the metal foils of current collectors to be shared by two electrochemical cells except for the ones on the bottom and the top of said lithium-ion battery groups. More electrochemical cells can be added in the way described above. This arrangement makes all of the different electrochemical cells within said battery group are electrically connected in parallel. According to Ohm's law, the voltage of a battery group equals the one of every single electrochemical cell, but the current of said battery group equals the sum of currents from every single electrochemical cells. The order of the packing layers from bottom to top as shown in FIG. 2 can be totally reversed in different designs.

All of the materials used to fabricate the present lithium-ion battery module are commercially available. Materials used as cathodes may be one chosen from the group below: $LiCoO_2$, $LiNiO_2$, $LiNi_{1/2}Mn_{1/2}O_2$, $Li_{1+x}(Ni_xCo_{1-2x}Mn_x)_{1-x}O_2$, $LiMn_2O_4$, $Li_xMnO_2$, $LiV_2O_4$, $Li_xV_2O_5$, $LiFePO_4$, $LiMnPO_4$, $LiCoPO_4$, $MnO_2$, $TiO_2$, $V_2O_5$, $V_3O_8$, $VO_2$, $V_6O_{13}$, $Cr_2O_5$, $WO_3$, $MoS_3$, $CoO_2$, $MoV_2O_8$ and $MoO_3$. Anodes may comprise following materials: graphite, carbons and non-carbon materials. Among these anode materials, graphite may include mesophase carbon microbeads (MCMB) that exhibit a specific capacity about 320 mAh/g, mesophase pitch-based carbon fiber (MPCF) and natural graphite. Carbons may include crystalline or amorphous styles. The non-carbon materials may be some $Li_xM$ alloys such as $Li_xSn$, $Li_xSi$, metal-carbon complexes such as graphene-silicon complex, and some metal oxides or metal nitrides. In addition, lithium metal can be used as the anode as well in the present lithium-ion battery module since it exhibits an extremely high energy density. The current generated from the cells has to be collected via current collectors. In general, a piece of aluminum foil is used as the cathode current collector 210 and copper foil is used as the anode current collector 250. These metal foils can be directly deposited through a production line as layers during a manufacture process, or used from commercial sources.

One of the most important materials used in the present flexible solid-state lithium-ion battery module may be solid electrolyte films. Presently used solid electrolytes in the lithium-ion batteries include solid polymer electrolytes, gel polymer electrolytes and polyelectrolytes. Among them, solid polymer electrolytes (SPEs) may be polyethylene oxide (PEO), polypropylene oxide (PPO), polyethylene amides (PEI), polyalkylene sulfide (PAS), and so on. In addition to SPEs, some gel polymer electrolytes (GPEs), such as polyacrylonitrile (PAN), polyvinylidene fluoride (PVDF), and polymethyl methacrylate (PMMA), have been more extensively used in preparation of lithium polymer batteries (LPBs) due to their high ionic conductivity. The high ionic conductivity of GPEs arises from liquid electrolytes trapped inside the polymeric cages. The other family of the SPEs is polyelectrolytes. They are typically networks of poly-(ethylene, propylene) oxides (EO-PO copolymers). The best candidates for the present invention may be SPEs because they are safe and reliable, flexible to different shapes, especially to thin film lithium-ion batteries. The SPEs do not release flammable gases at a high temperature. Because they are solid state, they are convenient to manufacture using different thin film deposition methods. Their manufacturing costs are expected to be reduced since both separators and protect circuits are not necessary with solid electrolytes.

Figure 3A:
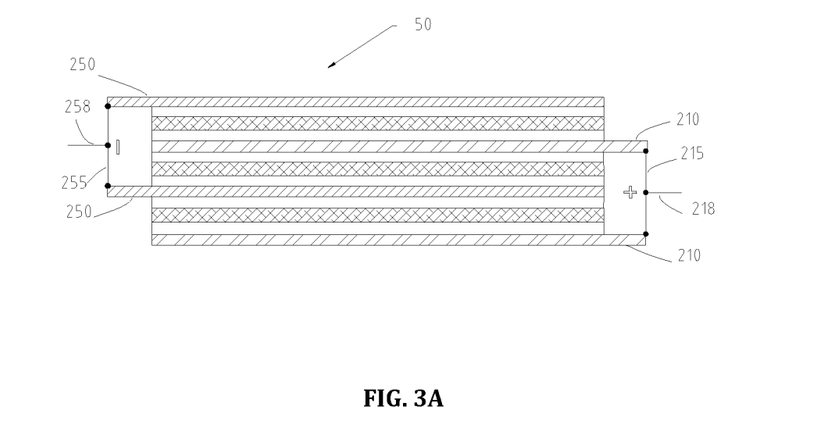
FIG. 3A shows the side view of a multiple-stacked lithium-ion battery group comprising three electrochemical cells and interconnection among these stacked cells.
Figure 3B:
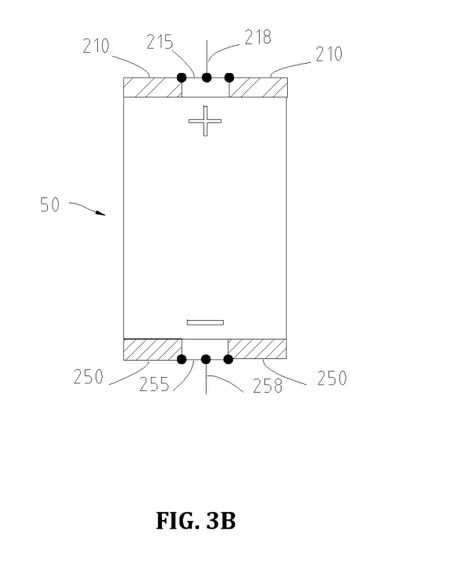
FIG. 3B shows the front view of a multiple-stacked lithium-ion battery group comprising three electrochemical cells and interconnection among these stacked cells.

More detailed demonstration of said lithium-ion battery group 50 is shown in FIG. 3A and FIG. 3B. The metal foils 210 as cathode (positive) current collectors are longer than the cell bodies for the purpose of electrical connections. Similarly, the metal foils 250 as anode (negative) current collectors are extended out from the other side of the electrochemical cells. FIG. 3B reveals that the terminals of different metal current collectors with the same pole in a battery group are not folded but staggered. Different positive terminals are connected with a metal strip or wire 215 and different negative terminals are connected with a metal strip or wire 255. There is a common positive metal terminal 218 and a negative metal terminal 258 for every battery group. These terminals of each said battery group are introduced to the side terminals 152 and 158 as shown in FIG. 1.

Figure 4:
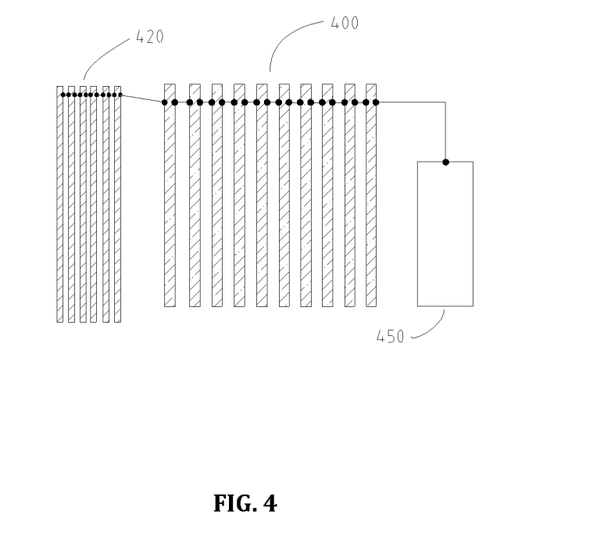
FIG. 4 demonstrates a diagram of an array interconnected with several flexible solid-state planar lithium-ion battery modules and its incorporation with a solar cell array.

More than one present lithium-ion battery modules can be assembled into an lithium-ion battery array as demonstrated in FIG. 4. Said lithium-ion battery modules can be connected through terminals 128 or 148 in series to increase output voltages or in parallel to increase output current. If eight flexible planar lithium-ion battery modules that possess 15 voltages and 1500 mAh discharge capacity are connected in series and two of this combinations are connected in parallel, for example, the resultant array consisted of these 16 modules may provide 120 V output voltages and 3 Ah discharge capacity. If its DC power is converted to AC output via a convertor, it can provide AC power for one hour with 3 A output current. Said lithium-ion battery modules used in this array possess only about 1.2 m$^2$ area and every one of said battery groups involved contains only three thin film electrochemical cells interconnected in parallel. By increasing the battery module areas, adding more thin film electrochemical cells to each battery group, or increasing amounts of electrolytic active materials in every electrochemical cell, one can significantly enhance the output power for said battery array. Because said lithium-ion battery modules are flexible and thin, they are also flexible to be assembled without occupying too much space. In particular, an array interconnected with multiple flexible solid-state lithium-ion battery modules can be matched very well with solar modules. As shown in FIG. 4, a battery array 400 can be connected to a solar cell array 420 and output energy to appliances 450 that may be an DC/AC convertor or other devices. In this setup, the electricity collected via the solar array 420 in day time can be stored in said lithium-ion battery array 400 which can provide electricity to the appliances 450 at night. The setup of FIG. 4 is very useful in some remote areas without power supplies. It is also useful for a family or a building as a flexible energy storage device which can be hanged on the wall. For example, a present lithium-ion battery module or an array of said lithium-ion battery modules can be matched to a semi-transparent organic solar module or an array of these solar modules stuck to the windows of a family house or a building to extend application ranges of these solar modules.

As described above, the presently provided flexible solid-state planar lithium-ion battery module 100 can be manufactured to be a single piece or separated pieces. In spite of its styles, all of said lithium-ion battery groups 50 and said interconnection wires are packed and sealed inside said backplane film 200 and said front plate film 205 to isolate said battery groups 50 from the air. Here said backplane film 200 and said front plate film 205 are preferable to use the same materials or different materials with similar thermal expansion coefficients. Said lithium-ion battery groups 50 may need to be fixed onto an additional plastic film substrate if necessary to increase stiffness of the entire module to support the other external parts.

The present flexible lithium-ion battery modules can be used in more areas. Besides what described above, for example, the present lithium-ion battery module can be fabricated into small sizes to fit some portable devices, especially flexible ones such as flexible computers, curved TV, flexible monitors and cell phones. The present lithium-ion battery module can be used in different applications with stacked electrochemical cells interconnected one another in parallel in a battery group. Different battery groups can be interconnected as described above in series or in parallel to provide required output voltages and powers. For various flexible portable electronic devices or powers of a home, the safety of a energy storage device is extremely important. As a solid-state planar lithium-ion battery module, the present invention provides a flexible, thin and safe lithium-ion energy storage device to fit different applications of portable electronic devices, flexible equipment and powers of a house.

Example 1: A Flexible all-Solid-State Planar Lithium-Ion Battery Module with LiCoO$_2$ Cathode, Graphite Anode and Solid Polymer Electrolyte In accordance with a preferred embodiment of the present invention, as illustrated in FIG. 1, an all-solid-state laminated flexible planar lithium-ion battery module was provided. A single electrochemical cell involved in this lithium-ion battery module comprised an anode layer 240 about 200 μm thick, a cathode layer 220 about 250 μm thick, an copper anode current collector 250 about 25 μm thick attached to said anode 240, an aluminum cathode current collector 210 about 25 μm thick attached to said cathode 220, and a layer of solid polymer electrolyte 230 about 30 μm disposed between the anode and the cathode layers, as shown in FIG. 2. The solid polymer electrolyte was a cationic conductor and had a conductivity of about 10$^{-4}$ S/cm at a room temperature. A poly(ethylene oxide) (PEO) with short EO side units was used as the solid electrolyte, which had been incorporated with LiN(CF$_3$SO$_2$)$_2$. A battery group 50 contained five electrochemical cells the areas of which were 300 cm$^2$ (20 cm×15 cm), interconnected one another back-to-back in parallel. The entire battery module 100 comprised 20 said lithium-ion battery groups arranged with five rows and four columns to form an effective battery area of 0.6 m$^2$ with a thickness of about 2 mm. The resultant area of the entire battery module was about 0.9 m$^2$ (120 cm×75 cm) including all of other additional parts shown in FIG. 1.

The preferred cathode materials of every electrochemical cell in this embodiment was LiCoO$_2$ mixed with acetylene black and polymeric binder PVDF (mass ratio: 6:3:1) coated onto said aluminum cathode current collector foil to form a 250 μm thick layer. Here large amount of acetylene had been used to increase the cathode conductivity due to a thick layer. The cathode layers could be coated onto both sides of an aluminum foil. After annealing, the completed cathode layers contained about 36% of $LiCoO_2$ (in volume) that possessed a specific capacity about 160 mAh/g and a density of 5.1 g/cm³. Every lithium-ion battery group possessed a cathode capacity about 11,016 mAh and the entire battery module had a cathode capacity of 220,320 mAh if all of said battery groups were interconnected in parallel. If all of the battery groups were interconnected in series, the cathode capacity of said battery module should be about 11,016 mAh and the output voltage was about 78 volts, which brought 859 Wh power to said lithium-ion battery module. The about 200 µm thick anode material was graphite powder MCMB (MesoCarbon MicroBeads) mixed with binder BM-400B at a ratio of 9:1. Said MCMB had a specific capacity about 340 mAh/g. The resultant anode capacity of said battery group was 11,749 mAh with a N/P ratio of 1.07.

The prepared flexible all-solid-state planar lithium-ion battery module is suitable to be used in different applications. It can be used in a family as an energy storage device, brought to outdoor as a power supply. It can be used with a flexible planar electronics, or installed onto back of a curved television set as a DC power.

Example 2: A Flexible Solid-State Planar Lithium-Ion Battery Module with $LiFePO_4$ Cathode, Graphite/Si Anode and Gel Polymer Electrolyte In accordance with another embodiment of the present invention, as illustrated in FIG. 1, a flexible solid-state laminated planar lithium-ion battery module was provided as a high energy storage device. A single electrochemical cell involved in this module comprised an anode layer 240 about 55 µm thick, a cathode layer 220 about 240 µm thick, an copper anode current collector 250 about 25 µm thick attached to said anode 240, an aluminum cathode current collector 210 about 25 µm thick attached to said cathode 220, and a layer of gel polymer electrolyte 230 about 40 µm disposed between the anode and the cathode layers, as shown in FIG. 2. The gel polymer electrolyte was a cationic conductor and had a conductivity of about $2.9 \times 10^{-3}$ S/cm at a room temperature. A polyacrylonitrile (PAN) was used as the gel polymer electrolyte, which had been impregnated with a mixed solution of propylene carbonate (PC) and ethylene carbonate (EC) containing 1.0 M $LiPF_6$. A battery group 50 contained five electrochemical cells the areas of which were 216 cm² (18 cm×12 cm), interconnected one another back-to-back in parallel. The entire battery module 100 comprised 72 said battery groups arranged with nine rows and eight columns to form a effective battery area of 1.56 m² with a thickness less than 2.5 mm. The resultant area of the entire battery module was about 1.84 m² (175 cm×105 cm) including all of other additional parts shown in FIG. 1. The preferred cathode materials of every electrochemical cell in this embodiment was $LiFePO_4$ mixed with acetylene black and polymeric binder PVDF (Mass ratio: 7:2:1) to form a 240 µm thick thin film layer. The specific capacity for $LiFePO_4$ was about 160 mAh/g and the density of the cathode material was about 3.7 g/cm³. Every battery group possessed a cathode capacity about 7,877 mAh and the battery module had a gross cathode capacity of 567,144 mAh if all of 72 battery groups were interconnected in parallel. If 72 battery groups were equally divided into two groups where all of 36 battery groups were interconnected in series, the gross capacity for the battery module were 15,754 mAh while these two groups were connected in parallel. The output voltage was above 122 volts for this combination. The power for said battery module was 1.92 kWh. Three or four present battery modules may satisfy electric usage for most families if they are combined with a powerful solar system. If more electrochemical cells were incorporated into every battery group, the power of said lithium-ion battery module can be increased. For example, the power may be increased to almost 4 kWh if every battery group contained 10 electrochemical cells back to back in parallel. The thickness of said lithium-ion battery module shall be increased to about 5 mm that was still much thinner than 183 mm thickness (7.2" in depth) of a Tesla home battery Powerwall with 6.4 kWh model. Tesla's Powerwall home lithium-ion battery is heavy (almost 100 Kg). However, the present battery module is much lighter. It is unnecessary to install cooling system in the present invention due to thin and large area to release heat and solid-state to reduce heat generation. In addition, a flexible and planar construction prevents explosion because any local overheat results in local deformation rather than explosion. Moreover, the presently invented lithium-ion battery module is adjustable in output and power control.

In the present embodiment, a complex anode was applied containing 30% of silicon particles (about 2 µm in diameter) mixed with 60% of graphite powder and 10% of PVDF. The Si particles was coated with carbon after thermal treatment. The resultant specific capacity for this C/Si complex anode was about 1000 mAh/g with a lithium alloy composition of $Li_{2.8}Si$. About 55 µm thick anode material mixed with 10% of binder BM-400B was applied in the present embodiment possessed a N/P ratio about 1.1.

Example 3: A Flexible Solid-State Thin Film Lithium-Ion Battery Module with $V_2O_5$ Cathode, Lithium Anode and Gel Polymer Electrolyte for Portable Electronic Devices In accordance with a further embodiment of the present invention to be used in portable applications, as illustrated in FIG. 1, a small size solid-state laminated flexible thin film lithium-ion battery module was provided. A single micro electrochemical cell involved in this module comprised an lithium foil, which played a role of both the anode layer 240 and the anode current collector 250, with a total thickness about 25 µm, a cathode layer 220 about 5 µm thick with a $V_2O_5$ density of 2.5 g/cm³, a piece of 25 µm thick aluminum foil attached to said cathode 220 as a cathode current collector 210, and a layer of gel polymer electrolyte 230 about 10 µm disposed between the anode and the cathode layers, as demonstrated in FIG. 2. The gel polymer electrolyte had a conductivity of at least $10^{-3}$ S/cm at a room temperature. A poly(methylmethacrylate) (PMMA) was used as the gel polymer electrolyte, which had been impregnated with a mixed solution of propylene carbonate (PC) and ethylene carbonate (EC) containing 1.0 M $LiClO_4$. A battery group 50 contained ten electrochemical cells, interconnected one another back-to-back in parallel. A battery group possessed an area of 15 cm² (5×3 cm). A battery group contained only about 0.19 grams of active cathode materials to generate about 47 mAh with a cathode capacity of 250 mAh/g. A completed flexible thin film lithium-ion battery module comprised four battery groups connected one another in parallel, which possessed about 188 mAh charge/discharge capacity with an output voltage about 3.7 volt. The area of said battery module was about 72 cm² (12×6 cm). Although the module capacity is too low to operate a cell phone, said battery module is very thin (less than 0.5 mm for the whole package), light and flexible. It may be used in some portable devices that require less current.

The cathode material was prepared through a sol-gel process, followed by a spray pyrolysis. A solution of lithium metavanadate $LiVO_3$ was run through a column of ion-exchange resin to generate a solution of decavanadic acid that was aged for about two weeks. This aged solution was sprayed through an ultrasonic spray head onto said aluminum foil 210, the first layer of which was sprayed onto a surface of 50 μm thick polyimide film, which had been sputtered 3 μm aluminum film, and the rests were 25 μm thick aluminum foils that were sprayed both sides. The substrate temperature was heated to 150° C. and the resultant $V_2O_5$ film was annealed at 190° C. to complete fabrication of the cathode material. With a certain spray rate, every coating could generate a layer of $V_2O_5$ about 1 μm. A thicker layer was available by repeating spraying. The resultant $V_2O_5$ thin film cathode 220 was charged and discharged for 2000 cycles with 90% discharge capacity of 250 mAh/g remained. A layer of lithium foil with 25 μm thickness was applied to be both of said anode 240 and said anode current collector 250.

Example 4: A Flexible all-Solid-State Lithium-Ion Battery Module with $LiMn_2O_4$ Cathode, Graphite Anode and Solid Polymer Electrolyte In accordance with a useful embodiment of the present invention, as illustrated in FIG. 1, an all-solid-state laminated flexible planar lithium-ion battery module was provided as a power supply of a flexible laptop computer. A single electrochemical cell involved in this module comprised an anode layer 240 about 130 μm thick, a cathode layer 220 about 110 μm thick, an copper anode current collector 250 about 25 μm thick attached to said anode 240, an aluminum cathode current collector 210 about 25 μm thick attached to said cathode 220, and a layer of gel polymer electrolyte 230 about 30 μm disposed between the anode and the cathode layers, as shown in FIG. 2. The solid polymer electrolyte 230 was poly(ethylene oxide) (PEO) with short EO side units, incorporated with $LiClO_4$, which contributed a conductivity of about $10^{-4}$ S/cm to at a room temperature. A battery group 50 contained six electrochemical cells the areas of which were 75 $cm^2$ (10 cm×7.5 cm), interconnected one another back-to-back in parallel. The entire battery module 100 comprised eight said battery groups arranged with two rows and four columns to form an effective battery area of 600 $cm^2$ with a thickness of about 1.5 mm. The resultant area of the entire battery module was about 704 $cm^2$ (32 cm×22 cm) including all of other additional parts demonstrated in FIG. 1. This area was similar to that of a 13" Apple laptop notebook.

The preferred cathode materials of every electrochemical cell in this embodiment was $LiMn_2O_4$ mixed with acetylene black and polymeric binder PVDF in a mass ratio of 7:2:1 to form a 130 μm thin film cathode layer. The specific capacity for $LiMn_2O_4$ was about 140 mAh/g and the density of $LiMn_2O_4$ was about 4.2 $g/cm^3$. Every battery group possessed a cathode capacity about 1,647 mAh and the battery module had a cathode capacity of 13,177 mAh if eight battery groups were interconnected in parallel. If eight battery groups were equally divided into two groups where all of the battery groups were interconnected in series, the gross cathode capacity were 3294 mAh while these two groups were connected in parallel. The output voltage was above 16 volts for this combination.

About 110 μm thick anode material was graphite powder MCMB mixed with binder BM-400B. The specific capacity for MCMB was about 320 mAh/g. The anode capacity was about 1,825 mAh for every battery group, which resulted in a N/P ratio about 1.1 for said lithium-ion battery group. Said battery module could support a flexible 13" laptop notebook to work for more than three hours with 1.0 A current. The reason to use $LiMn_2O_4$ as a cathode material was because it was cheap, environmentally friendly and safe. If the cathode material were changed to $LiCoO_2$ that possessed a higher specific capacity and density, said battery module could work for more than five hours.

In summary, the above examples indicate that the present invention significantly extends the applications of a flexible solid-state planar lithium-ion battery. With the present invention, the flexible solid-state planar lithium-ion battery module can be used in different areas, from portable electronics to home energy supplies. The resultant lithium-ion battery modules can not only be charged quickly, but also adjusted to the output voltages and powers by users. Moreover, said lithium-ion battery modules are flexible, thin, light, safe, easy to carry and use. They are also prepared to incorporate with solar modules to form independent energy systems.

What is claimed is:

1. A flexible solid-state multiple-stacked planar lithium-ion battery module comprising:
    two or more lithium-ion battery groups;
    said battery groups combined into one or more battery sections;
    four or more side terminals connected to the cathodes and the anodes of said battery groups via metal strips or wires;
    four or more side switches or relays to control said side terminals;
    one or more circuit control boxes;
    one or more positive rotary switches or relays connected to the positive input interfaces of said circuit control boxes with various poles connected to the first positive side terminals of said battery sections;
    one or more negative rotary switches or relays connected to the negative input interfaces of said circuit control boxes with various poles connected to the last negative side terminals of said battery sections;
    wherein said lithium-ion battery groups are packed and sealed inside a laminator with the order of backplane film, ethylene vinyl acetate (EVA) film, said lithium-ion battery groups, EVA film, and front plate film, wherein the materials of backplane and front plate films are one of the followings: polyimide (PI), polybenzimidazoles (PBIs), polyamideimide (PAI), polyetheretherketone (PEEK), polyethersulfone (PES), and polyamide (PA); and
    wherein said side terminals, said side switches or relays, said circuit control boxes, said rotary switches or relays are installed on said front plate film.

2. The lithium-ion battery groups of claim 1 comprising:
    one or more solid-state electrochemical cells, wherein all of said electrochemical cells are stacked back-to-back, and wherein all of the anodes and all of the cathodes of said electrochemical cells are interconnected in parallel, respectively.

3. The solid-state electrochemical cells of claim 2 comprising:
    an anode layer about 1-300 μm thick;
    a cathode layer about 1-300 μm thick;

an anode current collector about 10-50 μm thick attached to said anode;
a cathode current collector about 10-50 μm thick attached to said cathode; and
a layer of solid electrolyte film about 1-50 μm selected from the following materials: solid polymer electrolytes incorporated with lithium salts, gel polymer electrolytes impregnated with non-aqueous solutions of lithium salts, or polyelectrolytes incorporated with lithium salts.

4. The side terminals of claim 1 including:
two or more positive terminals connected to the cathodes of said lithium-ion battery groups;
two or more negative terminals connected to the anodes of said lithium-ion battery groups; and
two or more independent neutral terminals.

5. The side switches of claim 1 including:
four or more positive side switches connecting to another said positive side terminals or said neutral terminals;
four or more negative side switches connecting to another said negative side terminals or said neutral terminals; and
wherein said side switches are single-pole double-throw (SPDT) toggle switches, push-button switches or relays, wherein double-throw points to a neutral terminal and a signed (positive or negative) terminal.

6. The circuit control boxes of claim 1 including:
one or two positive input interfaces connecting to said positive rotary switches;
one or two negative input interfaces connecting to said negative rotary switches;
one to four positive input/output terminals with cables, wherein said cables can be connected to a solar module or wall sockets;
one to four negative input/output terminals with cables, wherein said cables can be connected to a solar module or wall sockets;
one or more USB outlets;
one or two spare ports to connect external devices;
one or more light indicators;
one or two electric circuits and devices to provide stable and constant charging voltage and current, and stabilize output voltage and current;
one electric circuit or device for remote control;
one or more circuit modules for wireless charge; and
one or more programmable logic circuits for automatic control of all switches, indicators and relays.

7. A flexible solid-state multiple-stacked planar lithium-ion battery module applied in wearable equipment comprising:
one or more lithium-ion battery groups;
said battery groups combined into one or more battery sections, wherein said battery sections are fully packed and sealed;
insulated metal wires connected to the anodes and the cathodes of said battery sections;
two or more side terminals connected to the cathodes and the anodes of said battery groups via said insulated metal wires;
two or more side switches to control said side terminals;
one or more circuit control boxes, wherein solar module input socket, USB outlets, and spare ports to connect external devices, are included;
one or more positive rotary switches connected to the positive input interfaces of said circuit control boxes with various poles connected to the first positive side terminals of said battery sections;
one or more negative rotary switches connected to the negative input interfaces of said circuit control boxes with various poles connected to the last negative side terminals of said battery sections; and
wherein said lithium-ion battery groups, said side terminals, said side switches, and said rotary switches have the same functions as the ones in claim 1.

* * * * *